(12) United States Patent
Dekker et al.

(10) Patent No.: US 6,344,289 B2
(45) Date of Patent: Feb. 5, 2002

(54) REACTANT FLOW ARRANGEMENT OF A POWER SYSTEM OF SEVERAL INTERNAL REFORMING FUEL CELL STACKS

(75) Inventors: Nicolaas Jacobus Joseph Dekker, Amsterdam (NL); Richard Griffith Fellows, Burnaby (CA)

(73) Assignees: Stichting Energieonderzoek Centrum Nederland, Petten (NL); British Gas PLC, Berkshire (GB)

( * ) Notice: Subject to any disclaimer, the term of this patent is extended or adjusted under 35 U.S.C. 154(b) by 0 days.

(21) Appl. No.: 09/297,835
(22) PCT Filed: Nov. 13, 1997
(86) PCT No.: PCT/NL97/00620
  § 371 Date: Jul. 2, 1999
  § 102(e) Date: Jul. 2, 1999
(87) PCT Pub. No.: WO98/21771
  PCT Pub. Date: May 22, 1998

(30) Foreign Application Priority Data

Nov. 13, 1996 (NL) .............................................. 1004513

(51) Int. Cl.[7] ................................................. H01M 8/04
(52) U.S. Cl. .............................. 429/17; 429/34; 429/26
(58) Field of Search .............................. 429/17, 13, 18, 429/32, 34, 38, 26, 20

(56) References Cited

U.S. PATENT DOCUMENTS

| | | |
|---|---|---|
| 4,722,873 A | 2/1988 | Matsumura |
| 5,192,627 A * | 3/1993 | Perry, Jr. et al. .............. 429/17 |
| 5,413,878 A | 5/1995 | Williams et al. |
| 5,518,828 A * | 5/1996 | Senetar ........................ 429/26 |
| 5,601,936 A * | 2/1997 | Dudfield et al. ............... 429/13 |
| 5,931,658 A * | 8/1999 | Sederquist et al. ......... 431/207 |

FOREIGN PATENT DOCUMENTS

| | | |
|---|---|---|
| EP | 442 352 | 8/1991 |
| JP | 62-274560 | 11/1987 |
| JP | 2-170368 | 7/1990 |

OTHER PUBLICATIONS

Patent Abstracts of Japan, vol. 096, No. 006, Jun. 1996, JP 8–45526.

"Molten Carbonate Fuel Cell Networks: Principles, Analysis and Performance" by Wilmer et al, Proceedings of the 28th Intersociety Energy Conversion Engineering Conference, Aug. 1993.

* cited by examiner

Primary Examiner—Stephen Kalafut
Assistant Examiner—Raymond Alejandro
(74) Attorney, Agent, or Firm—Sughrue Mion, PLLC

(57) ABSTRACT

An arrangement is proposed for a system with at least two molten carbonate or solid oxide fuel cell stacks (1, 2, 3). The cathode flows (14) of these stacks are connected in series while the anode flows (25) are in parallel. All stacks have an internal reforming device for a hydrocarbon fuel. Anode gas is recycled (24) from the stack outlets to the inlets. The invention allows the stacks to be of the same design and this reduces manufacturing costs. The cathode streams between the stacks are cooled by, for example, adding streams of cool air (15) to them. The cathode inlet temperatures can, therefore, be controlled by relatively inexpensive low temperature air valves. The invention allows the system to be designed with few heat exchangers, if any. The per pass utilization of all the oxidant streams and fuel streams are low. The efficiency of the system is typically 4–5 percentage points higher than that of equivalent conventional systems.

14 Claims, 3 Drawing Sheets

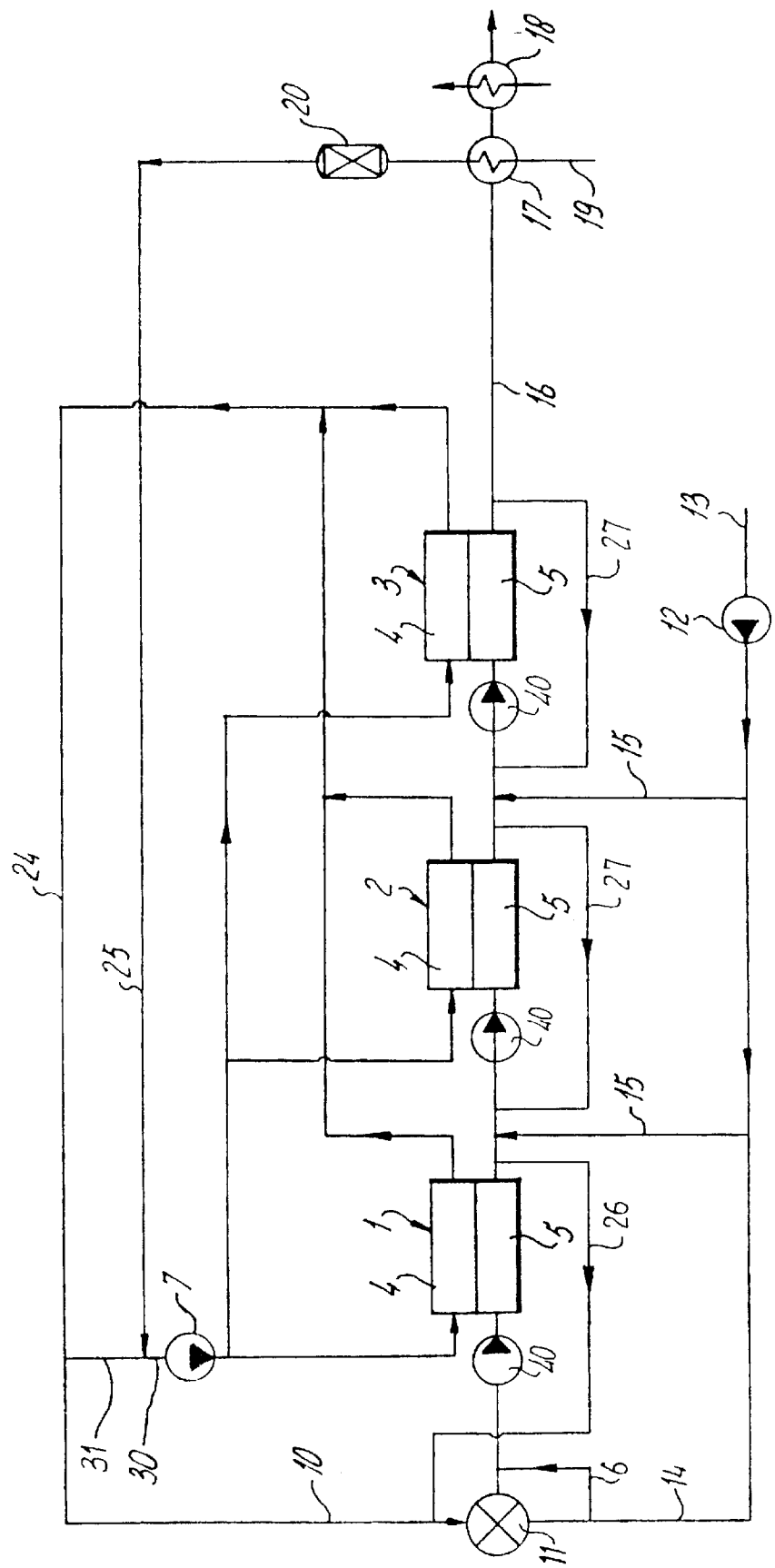

REACTANT FLOW ARRANGEMENT OF A POWER SYSTEM OF SEVERAL INTERNAL REFORMING FUEL CELL STACKS

The present invention relates to a system utilizing fuel stacks.

Such a system is known from 'Molten Carbonate Fuel Cell Networks: Principles, Analysis and Performance' of J. G. Wimer c.s., 28th IECEC, Atlanta, 1993. A number of MCFC fuel cell stacks is used because the practical size of a fuel cell stack is limited.

A first reason for such a limit is that the fuel cell stack must be small enough to be transported with ease to and from the site. Secondly it may be difficult to ensure an even gas flow distribution in a large stack. For these reasons molten carbonate fuel cell stacks may be limited to about 200 kW.

In the system according to Wimer both the cathodes and anodes of subsequent stacks are connected in series. For the anode, this results in increased pressures in the anode passages of the first (upstream) stack so the stack components have to be designed to withstand relatively high pressures.

EP-0 422 352 A2 describes a further multi-stack system. In this system $CO_2$ is removed from the oxidant outlet stream of a stack and returned into the oxidant inlet of the same stack. Two-stack systems are described in which the second stack acts as a $CO_2$ separation device for the oxidant outlet stream of the first stack. An embodiment, described in this European patent, includes series connection of the oxidant flows without cooling between stacks. Therefore the oxidant gas inlet temperature of the several stacks will be different. Because of that a high oxidant gas flow is required to cool the stacks resulting in low performance.

If a system according to the European patent application 0 442 352 A2 would be extended to systems with more than two stacks, anode outlet gas from all the stacks except the most downstream stack would be circulated through the cathode inlet of the same stack. This would mean that a burner had to be placed upstream of the cathode inlet of all stacks except one. This means that the system according to the European patent application 0 442 352 A2 is not practical to realize with more than two stacks.

SUMMARY OF THE INVENTION

The invention aims to provide a system which allows the use of stacks of a single design while retaining the advantages of series connection of the oxidant streams and giving low per pass fuel utilisations. Furthermore the invention aims to provide a system in which the highest absolute pressure in the anode part of the stacks can be lowered whilst the efficiency is increased. Besides, a minimum number of heat exchangers is needed and the temperatures are controlled by relative cheap low temperature valves.

Series connection of the oxidant streams gives a higher cathode gas flow rate per fuel cell stack than an equivalent parallel connected system. With series connection the cathode flow passes through each fuel cell stack and performs stack cooling on each pass. Consequently the cathode gas performs more stack cooling when flows are connected in series with cooling between the stacks than when they are connected in parallel with the same inlet and outlet temperature. This is advantageous as it allows either a reduction in stack outlet temperature or an increase in fuel utilisation compared to the equivalent parallel connected system. Reduction in outlet temperatures extends the life of the fuel stack. Increase in fuel utilisation gives a higher electrical efficiency.

The parallel connection of the anode streams ensures that all the anode channels are at essentially the same pressure. Furthermore if an anode recycle blower would be present it needs to produce a pressure sufficient to overcome the pressure lost in only a single fuel cell stack.

The present invention gives a low single pass utilisation per stack for both the anode and cathode flow at a high overall fuel utilisation. Owing to the low single pass utilisation local depletion, a non-uniform flow distribution within the stack will not be encountered and this gives a considerable advantage over the prior art. Besides anode recycle reduces the increase of the anode flow in the cells of the stack, which is favourable for the flow distribution. Also no steam injection is needed for the reform reaction and the prevention of carbon disposition.

It has to be understood that this system can be used for any type of fuel cell operating at relatively high temperature, such as a SOFC or MCFC.

Series connection has been proposed previously. However, systems known in the prior art do not allow internal reforming stacks to operate with the same oxidant gas inlet temperature, fuel gas inlet temperature, stack outlet temperature and very similar oxidant gas flow rates and fuel gas flow rates. This is possible with the arrangement according to the present invention. The same stack design can therefore be used for all the stacks and this reduces manufacturing cost.

In the system according to WIMER a combustor is provided being fed by oxidant, which is branched from the most downstream cathode exhaust and the fuel gas is branched from the most downstream anode exhaust. This mixture is transferred after its combustion and after heat exchange to lower its temperature to the cathode feed side of the most upstream fuel cell stack.

To practice this solution there are several drawbacks. First of all the percentage oxygen in the oxidant entered into the combustor is relatively low and this is more particularly true if the oxidant is air. Because of that combustion will be difficult if the percentage of combustible gas in the anode exhaust gas is relatively low. This means that special measures may have to be taken to ensure complete combustion of any fuel gas from the anode.

Secondly a high temperature pumping means such as a blower is needed to produce the flow of cathode exhaust gas to the combustor.

According to a further embodiment of the invention this drawback is obviated in that the air is connected with said pumping means, said pumping means being connected on the other hand with the feed of the exhaust gases of the anode outlets to the combustion device and the feed of oxidant gas to the cathode inlets between the several fuel cell stacks. The heat exchanger between the combustor and the first cathode inlet as used in the system according to WIMER can be omitted.

This embodiment of the invention is based on the idea to use fresh air in the combustor and to position the compressor upstream from this combustor so that it is not subjected to the high temperature and/or corrosive gasses from the combustor.

BRIEF DESCRIPTION OF THE DRAWINGS

The invention will be further elucidated referring to several embodiments which will be detailed referring to the enclosed drawings, in which;

FIG. 3 shows yet another embodiment, in which cathode gas blowers allow the cathode streams of the stacks to be at the same pressures.

DETAILED DESCRIPTION OF THE INVENTION

Figure 1:
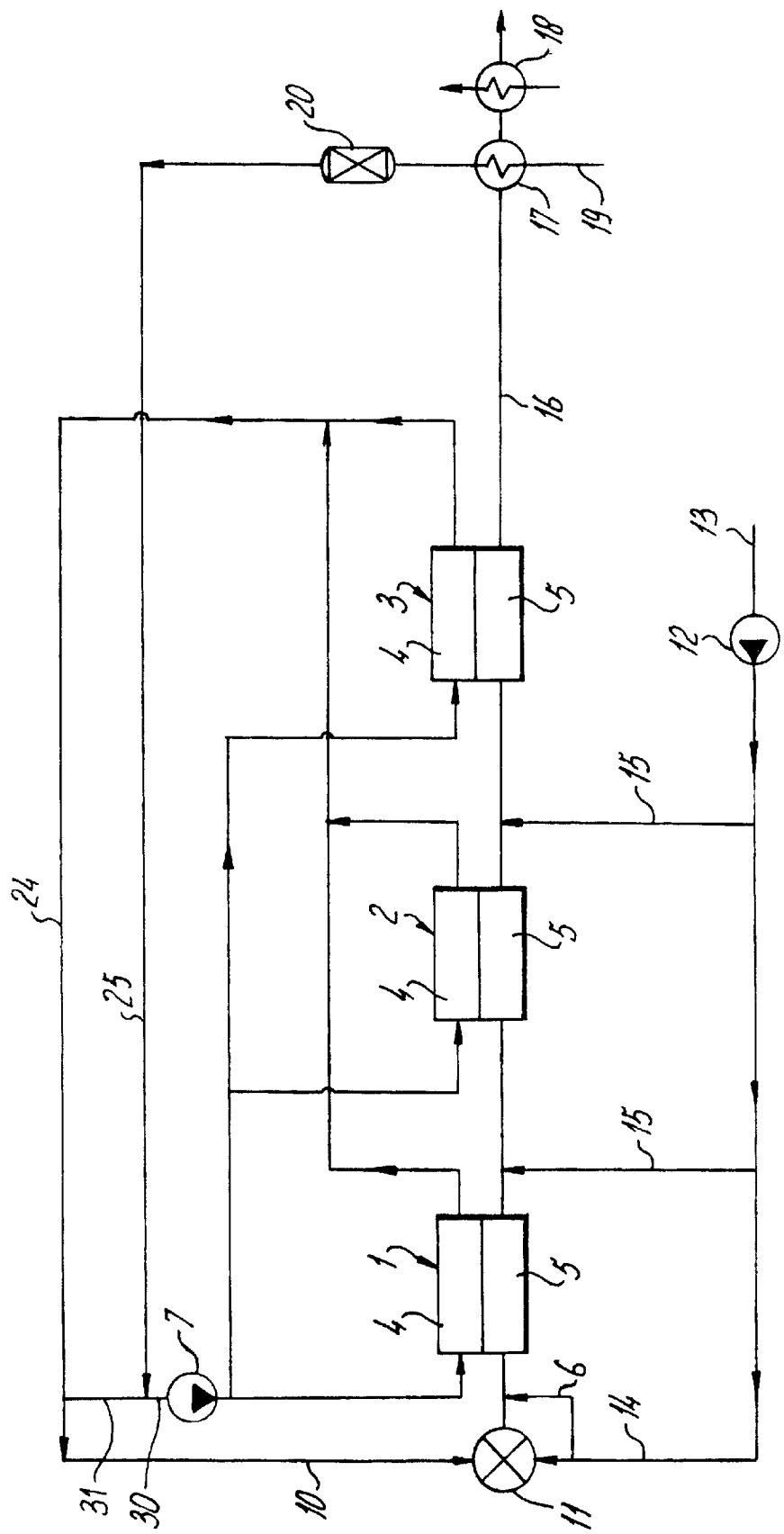
FIG. 1 shows a first system according to the invention having the anode inlets and outlets of the fuel cell stacks connected in parallel.

FIG. 1 shows a first embodiment of the system according to the invention. Three fuel cell stacks 1–3 are provided. It will be understood that at least two such stacks are necessary to provide improved efficiency. However, more than two fuel cell stacks can be used.

Each fuel cell stack comprises anode passages 4 and cathode passages 5. The flow of gases is indicated by arrows. The first or most upstream fuel cell stack 1 is provided with oxidant. Air enters to inlet 13 and is compressed by relatively cheap and simple low temperature air pump 12. The main flow of air goes to feed 14 of a combustor 11. Part of the flow can be by-passed by stream 6 to obtain a burnable mixture for the combustor. The combustor is connected on the other hand to feed 10 of the exhaust gases from the anode outlets. It should be noted that a substantial part of this exhaust gas is recirculated through conduit 30 to provide moisture for the process. This also prevents carbon deposition in the anode passages.

The exhaust gases of the combustor are introduced at the inlet side of the cathode manifold of fuel cell stack 1. Gases exhausted from the cathodes of fuel cell stack 1 are sent to the inlet of cathode passages 5 of fuel cell stack 2 and so on. Additional air is added as is indicated by arrows 15 to lower the temperature of the oxidant flow between the cathode manifolds. The oxidant gas from the last cathode manifold is exhausted through conduit 16 to heat exchanger 17 and possibly heat exchanger 18. In heat exchanger 17 the fresh fuel temperature is increased by lowering the temperature of the oxidant. The heated fuel gas is subjected to a desulphurization step desulphurisator 20 and supplied to pump 7 through conduit 25.

Fresh gas without sulphur is introduced in conduit 30 and mixed with a part of the spent fuel gas. Through compressor 7 its pressure is increased to allow pumping through the stacks. In the embodiment of FIG. 1 the anode stacks are connected in parallel and anode gas from each stack is discharged through line 24 and partly fed to compressor 7.

In these embodiments there are no heat exchangers in the cathode gas flow between the stacks. These cathode gas streams will be cooled by adding a fresh cool air stream thereto. The addition of the air streams ensures that the flow rates of the cathode gas in each of the stacks are substantially equal.

As is clear from the above, exhaust gas is fed to the burner which also receives fresh oxidant gas. Thus the oxidant supplied to the burner has a high oxygen concentration and this improves combustion. The cathode outlet of the most downstream fuel cell stack is directly connected to a heat exchanger. The other medium in this heat exchanger being the inlet of the fuel gas, can be subjected to a desulphurization step after increasing of its temperature.

From calculations it can be concluded that the system according to FIG. 1 has a higher efficiency and/or lower total cell area than parallel connected systems. Each stage has a nearly equal gas flow allowing a single stack design to be used throughout. The maximum stack pressure is lower than in an equivalent three stage system with series connection of both anode and cathode flows and a relatively wide operating window can be used. No expensive cathode recycle blower is necessary nor any heat exchanger other than those needed for fuel preheat and waste heat recovery.

In the embodiment of FIG. 1 recycle blower 7 is provided in conduit 30. However, it might alternatively be located in conduit 24 or 31. If it is in conduit 24 the capacity will be higher, but a lower pressure in the anode passages 4 will be produced.

As alternative to the embodiment shown in FIG. 1 one or more heat exchangers can be provided in the line between the cathode outlet of one fuel cell stack and the cathode inlet of the adjacent fuel cell stack.

Figure 2:
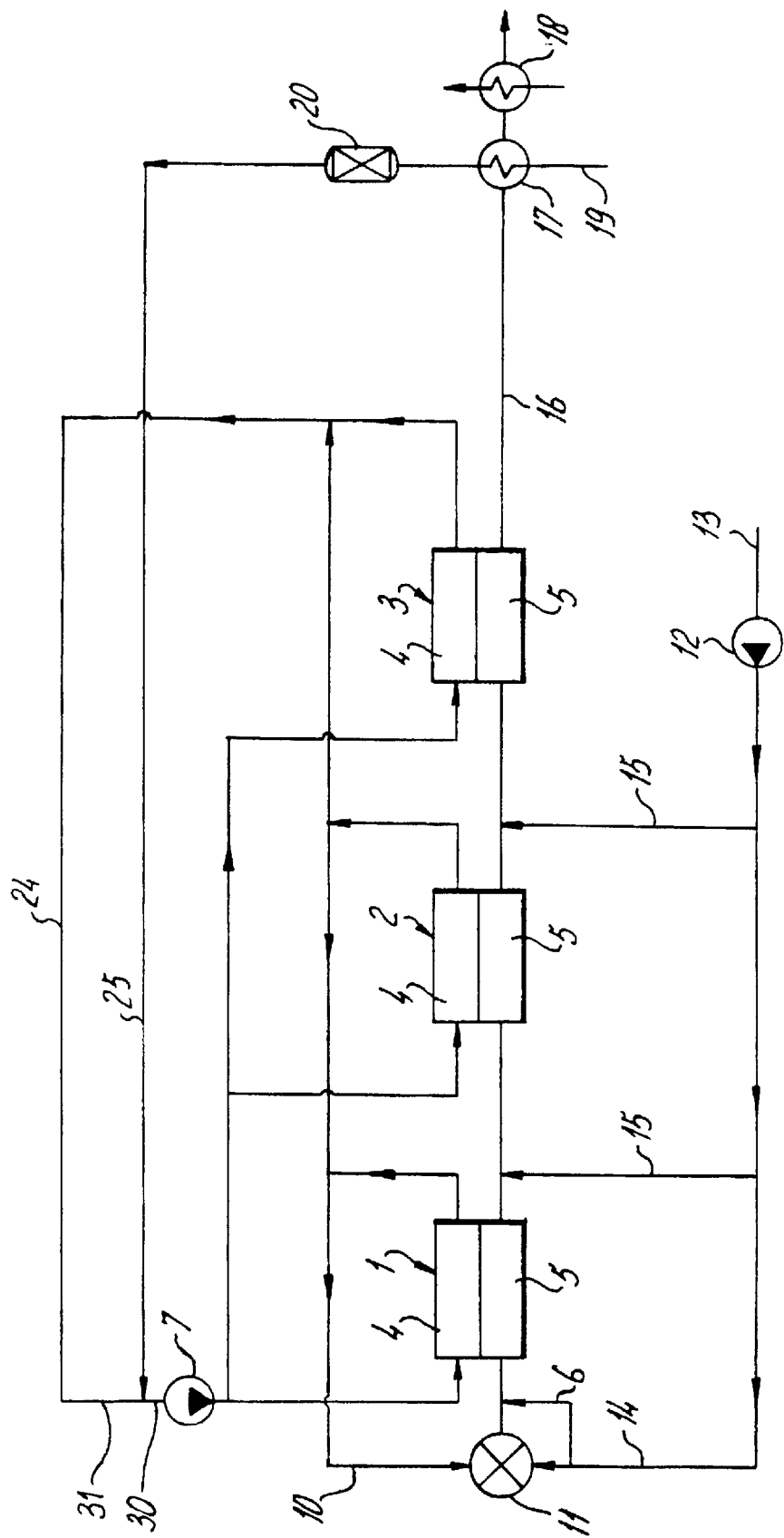
FIG. 2 shows a further embodiment of the invention, in which the anode outlet streams of the stacks are not mixed together

In the embodiment shown in FIG. 2 the fuel that passes through the burner 11 comes primarily from the upstream stacks 1,2 and the anode exit gas, that is recycled, basically originates from the downstream stacks 2,3. This is advantageous when the anode exit gas from the downstream stack(s) is less depleted in $H_2$ and CO than that from the upstream stack(s). In this way an improvement in electrical efficiency is obtained since the anode inlet gas will have a higher hydrogen concentration.

FIG. 3 shows another embodiment of the invention, in which cathode gas blowers 40 are employed. The cathode blowers, located at the cathode inlet streams, and the cathode recycle streams 26,27 ensure that all the cathode outlets are automatically at the same pressure, while the advantages of cathode series connection are retained. If the recycle stream 26 of the upstream stack 1 joins the burner inlet stream upstream of the burner, then all the anode outlet pressures and all the cathode outlet pressures will automatically be equal. Alternatively, the cathode blowers could be placed at the stack outlets, ensuring that the cathode inlet pressures are equal.

From the several embodiments shown it will be clear for the person skilled in the art that starting from the teaching of the description many further alternatives could be designed without leaving the scope of the invention as defined by the appended claims.

What is claimed is:

1. A system comprising at least two fuel cell stacks each stack having an anode and cathode and being for use with a hydrocarbon containing gas, wherein the cathodes are connected in series, means are provided for cooling a cathode exit gas between the or each two adjacent stacks, each of said stacks comprising means for internal reforming and means are provided to recycle at least a portion of an anode exit gas from said stack to an anode inlet of said stack, wherein anode inlets and outlets of the fuel stacks are connected in parallel, and wherein each of said anode inlets is connected to a common source conduit and each of said anode outlets is connected to a common exhaust conduit.

2. The system according to claim 1, wherein said means for cooling said cathode exit gas comprise a feed of an oxidant gas to a cathode inlet between the or each two adjacent stacks to effect cooling of the cathode exit gas from an upstream stack of the or each two adjacent stacks.

3. The system according to claim 1, wherein means for pumping are provided before said anode inlets and after the feed of fresh hydrocarbon containing gas and a recirculated anode exit gas.

4. The system according to claim 1, wherein means for pumping are provided in the anode gas stream before a split into a recycle stream and an exhaust stream.

5. The system according to claim 1, comprising a combustion device to combust anode exit gas from the anodes with oxidant gas, wherein means are provided to add the resulting combustion product to a cathode inlet stream of a first upstream fuel cell stack.

6. The system according to claim 5, wherein an inlet for air is connected with oxidant gas pumping means, said oxidant gas pumping means also being connected with the feed of anode exit gas to the combustion device and the feed of oxidant gas to cathode inlets between the or each adjacent two stacks.

7. The system according to claim 1, wherein means for pumping are provided on a cathode inlet stream to at least one of said stacks, and means are provided to recycle a portion of a cathode outlet stream from said stack to said cathode inlet stream.

8. The system according to claim 1, wherein means are provided to operate the stacks at an operating temperature above 500° C.

9. The system according to claim 1, wherein a cathode outlet a last downstream fuel cell stack is connected with a heat exchanger.

10. The system according to claim 9, wherein a fuel gas inlet is in heat exchange relationship with said cathode outlet.

11. The system according to claim 10, wherein said fuel gas inlet comprises a desulphurization device downstream of the heat exchanger.

12. The system according to claim 1, wherein means are provided to recycle a greater proportion of the anode exit gas from one or more of said at least two fuel stacks to the anode inlets of the stacks than that of the anode exit gas from the remaining other stacks of said at least two fuel stacks.

13. The system according to claim 1, consisting of three or more stacks.

14. The system according to claim 1, wherein means for pumping are provided on a cathode outlet stream to at least one of said stacks and means are provided to recycle a portion of the cathode outlet stream from said stack back to said cathode inlet stream.

* * * * *